Figure 1:
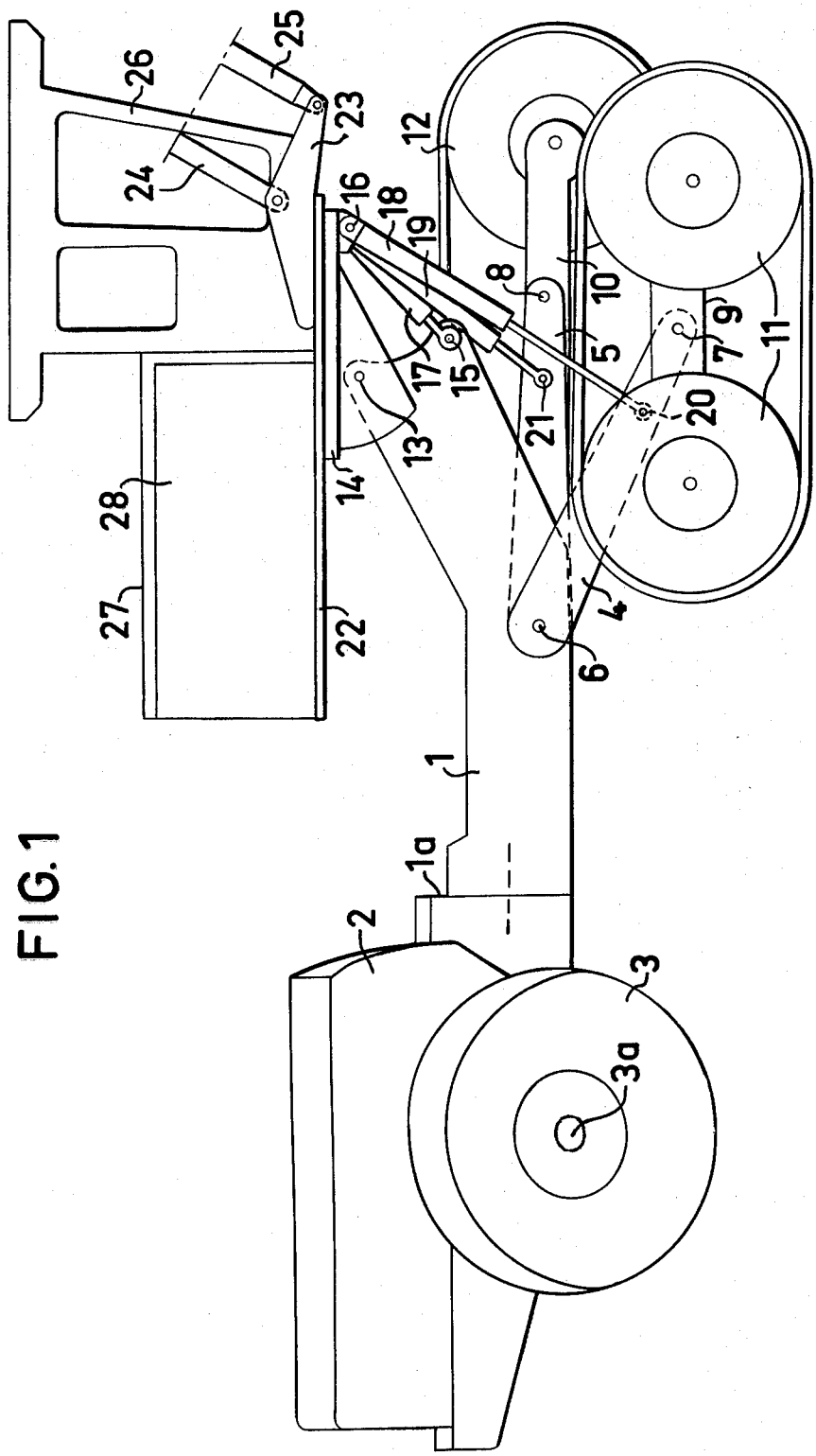

United States Patent [19]

Lindblom et al.

[11] 3,924,704

[45] Dec. 9, 1975

[54] STABILIZING ARRANGEMENT IN TERRAIN-GOING VEHICLES

[75] Inventors: Karl Thore Lindblom; Erik Torsten Forslund, both of Alfta, Sweden

[73] Assignee: Ostbergs Fabriks AB, Alfta, Sweden

[22] Filed: May 31, 1974

[21] Appl. No.: 475,292

[52] U.S. Cl. .................... 180/41; 280/6 H; 280/6.1
[51] Int. Cl.² ......................................... B60G 17/00
[58] Field of Search ...... 180/41; 280/6 H, 6.1, 6.11, 280/DIG. 1

[56] References Cited
UNITED STATES PATENTS

| | | | |
|---|---|---|---|
| 1,159,841 | 11/1915 | Holt | 180/41 X |
| 2,904,341 | 9/1959 | Heitshu | 280/6.11 |
| 3,236,535 | 2/1966 | Barber | 280/6.1 |
| 3,253,669 | 5/1966 | Schuetz | 180/41 |
| 3,638,805 | 2/1972 | Garnier | 280/6 H X |
| 3,680,878 | 8/1972 | Beck | 280/6 H |
| 3,806,141 | 4/1974 | Janer | 280/6.1 |

Primary Examiner—Leo Friaglia
Assistant Examiner—Terrance L. Siemens
Attorney, Agent, or Firm—Pierce, Scheffler & Parker

[57] ABSTRACT

A terrain-going vehicle of the forked frame type, the stem fore end being supported by a front wheel shaft, and the fork legs being at each end supported by a different rear bogie shaft; said legs having their inner ends pivoted to the frame; the rear end of the frame, extending between the two fork legs, supports a movable fundament plate, and the fore end of the frame is rotatable around its longitudinal axis with respect to the rest of the frame; a hydraulic jack forming an upstanding telescopic bar connected between each leg and an associated point on said fundament plate, the two jacks being separately operable to keep the fundament plate level, even when driving along a lateral slant in the terrain and facilitating the overcoming of ground obstacles.

3 Claims, 4 Drawing Figures

STABILIZING ARRANGEMENT IN TERRAIN-GOING VEHICLES

This invention relates to a stabilizing arrangement in terrain-going vehicles having a driver's cabin and a rearly branched framework, where the stem of the branches constituting the frame of the vehicle is supported at its front end by a front wheel shaft, and the branches constituting lateral legs have each of their ends supported by a different rear shaft for a bogie bar.

It is a well-known fact that the driver of a vehicle is subjected to severe stresses when driving a laterally inclined vehicle due to the necessarily oblique position of his back, especially as the jolts of the vehicle caused by roughness of the terrain as well as its natural vibrations are added. Another disadvantage of the conventional terrain-going vehicles is found in their difficulties, or inability, of surmounting high obstacles on the ground or driving in deep snow, as the relatively low level framework will act as a brake. Moreover, the total height of different work equipment carried by conventional vehicles may raise difficulties in transport between different work places.

All the aforesaid difficulties are removed or reduced by the arrangement of the present invention in such a way that the rear end of the frame of the vehicle serves as a support for a fundament plate for receiving operation equipment, and the two lateral legs are pivoted in alignment with each other at each side of the frame, a separately operable hydraulic jack forming an upstanding and longitudinally variable supporting bar between each leg and an associated point on the plate in order to enable an individual raising and lowering of the rear shafts, the front part of the frame, supporting the front wheel shaft, being freely rotatable around its longitudinal axis, whereby it will be possible, on one hand, to straighten up the vehicle including the fundament plate when driving along a lateral slant in the terrain and, on the other hand, to enable a simple and gentle surmounting of obstacles on the ground.

Figure 3:
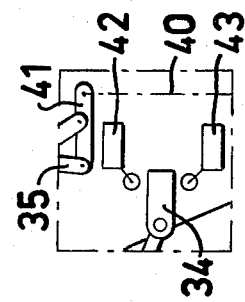
Figure 4:
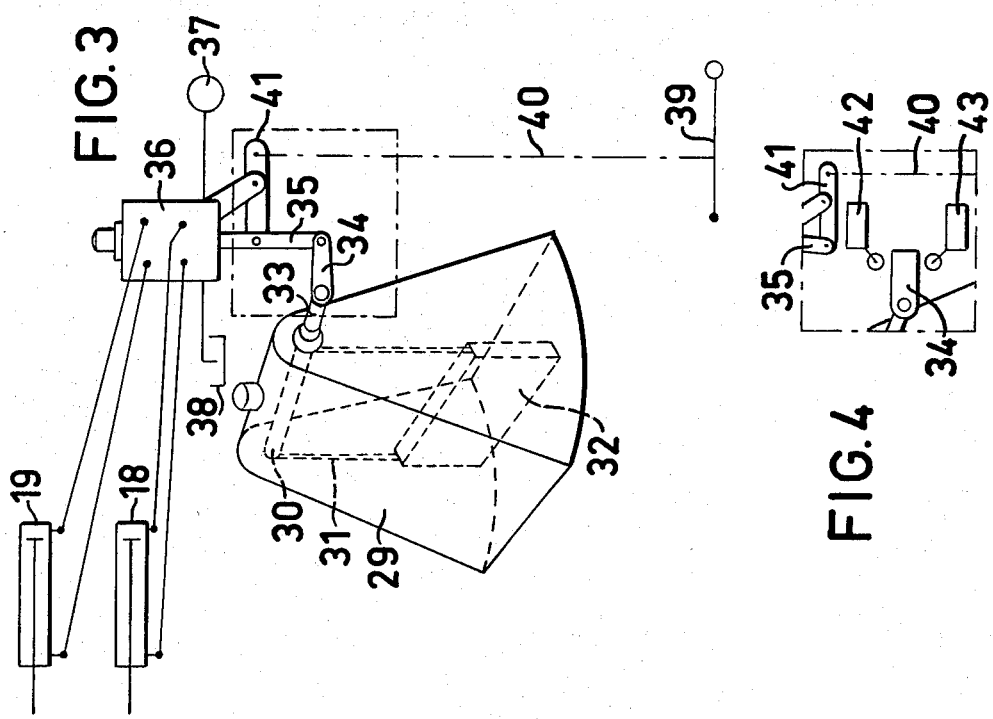
Figure 2:
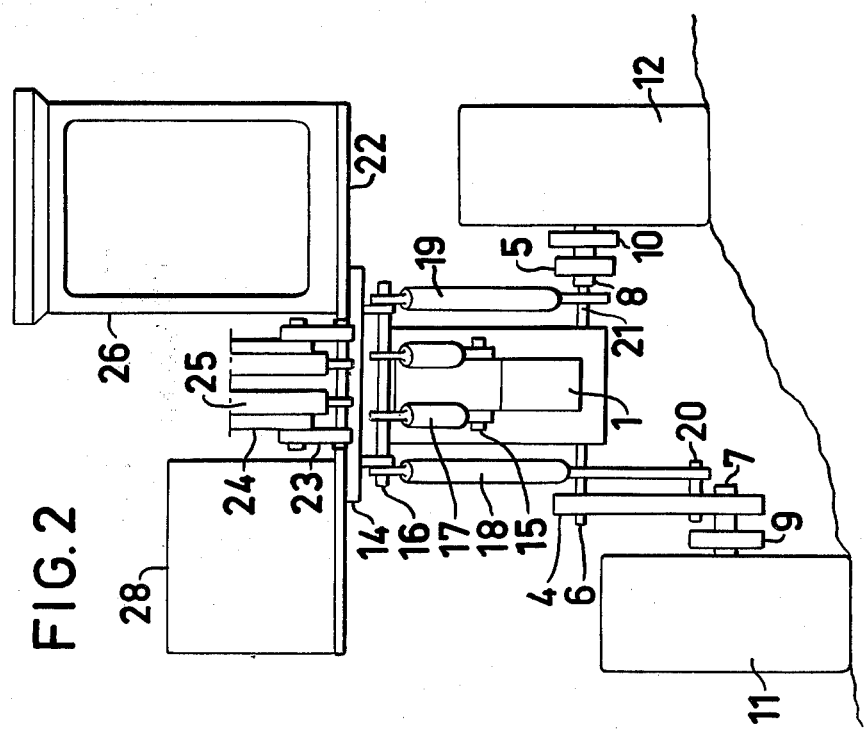

The invention will be described below more in detail with reference to the appended drawings, wherein FIG. 1 shows a schematic, sectional view of a terrain-going vehicle provided with the arrangement of the invention when being driven laterally inclined on the terrain, FIG. 2 shows a rear view of the vehicle, whose front portion is omitted in order not to complicate the figure, FIG. 3 shows a schematic view of automatical erection of the vehicle and FIG. 4 shows a variant of the device of FIG. 3.

The vehicle is of a type, whose framework has a branched rear portion.

A framework 1, which is bent in an angle upwards at its back portion, supports in its front portion a vehicle motor under a housing 2 and is carried by wheels 3 on a front shaft 3a. At 1a the front section of the framework is freely rotatable around its longitudinal axis relative to the rear section of the framework as illustrated by the dashed horizontal line. At the portion of the framework where it is bent upwards, two longitudinal legs 4 and 5 are mounted opposite to each other with one of their ends on each side of the framework 1 at the pivot point 6. In the example shown the other ends of the longitudinal arms are mounted at the pivot points 7 and 8, respectively, of bogie bars 9 and 10, respectively, for the wheel pairs 11 and 12, respectively, provided with track means as shown in FIG. 1.

A fundament plate 14 is mounted with its front portion at the top of the frame end around a shaft 13. Two hydraulic jacks are placed between a shaft 15 at the bottom of the framework and a shaft 16 at the rear end of the plate 14, only one of which, 17, in FIG. 1, is visible. The shaft 16 also serves as support for one end each of two hydraulic jacks 18 and 19, the other ends of which are mounted on the lower parts of legs 4 and 5 at pivot points 20 and 21, respectively.

In the example shown a platform 22 is mounted on the fundament plate 14, which is rotatable and supports a turntable for the platform. At the rear end of the platform a jib foot 23 is arranged from which a crane beam extends, which is only indicated in the example by a pivoted arm 24 and a hydraulic jack 25. On each side of the space reserved for the pivotal motion of the crane jib on the platform 22 (see FIG. 2) there are disposed a driver's cabin 26 with encased drive aggregate 27 for crane jib and the turning mechanism of the fundament plate as well as a box 28 for fuel and oil tanks. In the driver's cabin there are remote control means for guiding the motion of the crane jib and for manoeuvering the vehicle. The crane arrangement can be replaced with a processor.

In order not to complicate FIGS. 1 and 2 unnecessarily the different control means with manoeuvering means have been omitted.

FIGS. 1 and 2 show the terrain vehicle when being driven on laterally inclined ground, which has been compensated by actuating the hydraulic jack 18 so that the wheel pair 11 has been lowered to a required extent for maintaining the fundament plate 14 with driver's cabin 26 and equipment in a level position, as is apparent from the figures. It is of no importance that the front frame section is laterally inclined. The wheel pair 12 has a position corresponding to normal operating height of the vehicle (the framework). Upon driving in terrain with small hills but substantially plane or in deep snow, the possibilities of advancing are increased by parallel influence of the two hydraulic jacks 18 and 19 to maximum extension so that the whole framework of the vehicle is pivoted upwards around the front shaft 3a. Inversely, during transport the hydraulic jacks will be compressed so that the vehicle framework will be pivoted downwards around the front shaft 3a, the fundament plate with supported equipment being lowered in a corresponding manner.

Compensation of ascent and descent so that the fundament plate maintains its horizontal position is brought about by actuation of the hydraulic jacks 17.

By coordination of the hydraulic operations for lateral inclination, on the one hand, and ascent and descent, on the other hand, the driver can always secure an upright and comfortable position. However, in order that the driver must not always have his attention constantly directed to slope changes in the terrain, the manual control means for principally the bogie hydraulic means can be supplemented with a simple automatic system. One example thereof is shown in the schematic view according to FIGS. 3 and 4.

A sector-shaped vessel 29 with the sector ends facing the longitudinal direction of the vehicle is placed on a protected place of the vehicle framework. At the upper portion of the vessel a shaft 30 is mounted so that it can rotate freely, to which shaft two rods 31 are rigidly connected, which rods support a plate 32 at their bottom portion. The vessel 29 is filled with a fluid at least partly to damp the oscillations of the pendulum formed by the details 31, 32. On its end 33 projecting outside the vessel the shaft 30 has a lever 34 acting on the operating rod 35 of a control means 36. This is shown as connected to a pump 37 and an oil tank 38 and has inlets and outlets (not shown in detail) for the hydraulic jacks 18 and 19 having double action. The control means 36 can also be operated manually by the vehicle driver via the symbolic lever 39, the rod 40 and the link 41. When driving in laterally inclined terrain the pendulum 31, 32 will make the corresponding deviation and adjust the control means to feeding of the hydraulic jack corresponding to straightening up the vehicle without engaging the driver. The liquid-damping of the pendulum serves for guarding against erroneous actuation of the hydraulic jacks, e.g. at momentary obliquities or jolts.

FIG. 4 shows an alternative to the fully mechanical version of automatical parrying of lateral incline shown in FIG. 3 within dash-and-dot lines. In this case the lever 34 of the pendulum is brought to act on one of two limit switches 42 and 43, all according to the vehicle being inclined in one or the other direction, and then a corresponding electrical circuit is closed to feed a magnet coil actuating the control means 36 in known manner.

A similar arrangement of the pendulum might also be used for horizontal setting of the fundament plate 14 at ascent and descent by automatical actuation of the hydraulic jacks 17 belonging to the plate 10.

The invention is not limited to the embodiment described above but different modifications are obvious to one skilled in the art, especially a replacement of the included details with other elements with similar function. Especially another balancing means can be used instead of the pendulum shown for the automatical compensation of the lateral inclination of the vehicle.

What is claimed is:

1. A stabilizing arrangement in terrain-going vehicles having a driver's cabin and a rearly branched framework where the stem of the branches, constituting the frame of the vehicle, at its front end is supported by a front wheel shaft, and the branches, constituting longitudinal legs, have each of their ends supported by a different rear shaft for a bogie bar, the improvement wherein the rear end of the frame of the vehicle serves as a support for a fundament plate for receiving operation equipment, and the two longitudinal legs are pivoted in alignment with each other at each side of the frame; a separately operable hydraulic jack forming an upstanding and longitudinally variable supporting bar between each leg and an associated point on the plate in order to enable an individual raising and lowering of the rear shafts, the front part of the frame, supporting the front wheel shaft, being freely rotatable around its longitudinal axis, whereby it will be possible, on one hand, to straighten up the vehicle including the fundament plate when driving along a lateral slant in the terrain and, on the other hand, to enable a simple and gentle surmounting of obstacles on the ground.

2. An arrangement according to claim 1, wherein the fundament plate is provided with a turntable for orienting the operation equipment on the plate in the plane thereof, the fundament plate itself, or a platform supported by it, forming a bearing surface for the driver's cabin and fuel and oil tanks for all driving purposes, the driver's cabin being provided with a remote control for the operation of work tools as well as the operation of the vehicle.

3. An arrangement according to claim 2, wherein said fundament plate itself, or a platform by it, form a bearing surface for crane means and crane drive means and motor means for rotating the fundament plate or platform.

* * * * *